United States Patent
Economoff et al.

[11] Patent Number: 6,059,061
[45] Date of Patent: May 9, 2000

[54] AIR COOLING OF VEHICLE RADIATORS

[76] Inventors: Peter P. Economoff, 306 E. Gutierrez St., Santa Barbara, Calif. 93101; Charles V. Love, 730 Alto Dr., Santa Barbara, Calif. 93110

[21] Appl. No.: 09/120,355

[22] Filed: Jul. 22, 1998

[51] Int. Cl.⁷ .................................................. B60K 11/00
[52] U.S. Cl. .......................................... 180/68.1; 180/68.4
[58] Field of Search ................................ 180/68.1, 68.2, 180/68.4, 68.6; 56/DIG. 72

[56] References Cited

U.S. PATENT DOCUMENTS

| | | |
|---|---|---|
| 4,723,594 | 2/1988 | Koehr et al. . |
| 4,726,326 | 2/1988 | Charles et al. . |
| 4,846,258 | 7/1989 | Charles . |
| 4,940,100 | 7/1990 | Ueda . |
| 5,113,819 | 5/1992 | Murakawa et al. . |
| 5,209,285 | 5/1993 | Joshi . |
| 5,632,673 | 5/1997 | DeRees . |
| 5,689,953 | 11/1997 | Yamashita et al. . |

FOREIGN PATENT DOCUMENTS

| | | | |
|---|---|---|---|
| 1958190 | 6/1971 | Germany | 180/68.1 |

*Primary Examiner*—Richard M. Camby
*Attorney, Agent, or Firm*—William W. Haefliger

[57] ABSTRACT

In combination with a vehicle hood and windshield, an engine compartment, an engine in the compartment, and a heat radiator located to pass cooling air flowing toward the engine, the radiator having an air inlet side, that combination comprising a cooling air receiving plenum chamber located at the air inlet side of the radiator; air inlet ducting having an entrance proximate the windshield to receive air flowing over the vehicle hood; and at least one passage communicating with the air inlet ducting and the plenum chamber to deliver cooling air to the plenum chamber for flow through the radiator. One plenum chamber acts to recover air pressure for efficient direct application to the radiator.

23 Claims, 2 Drawing Sheets

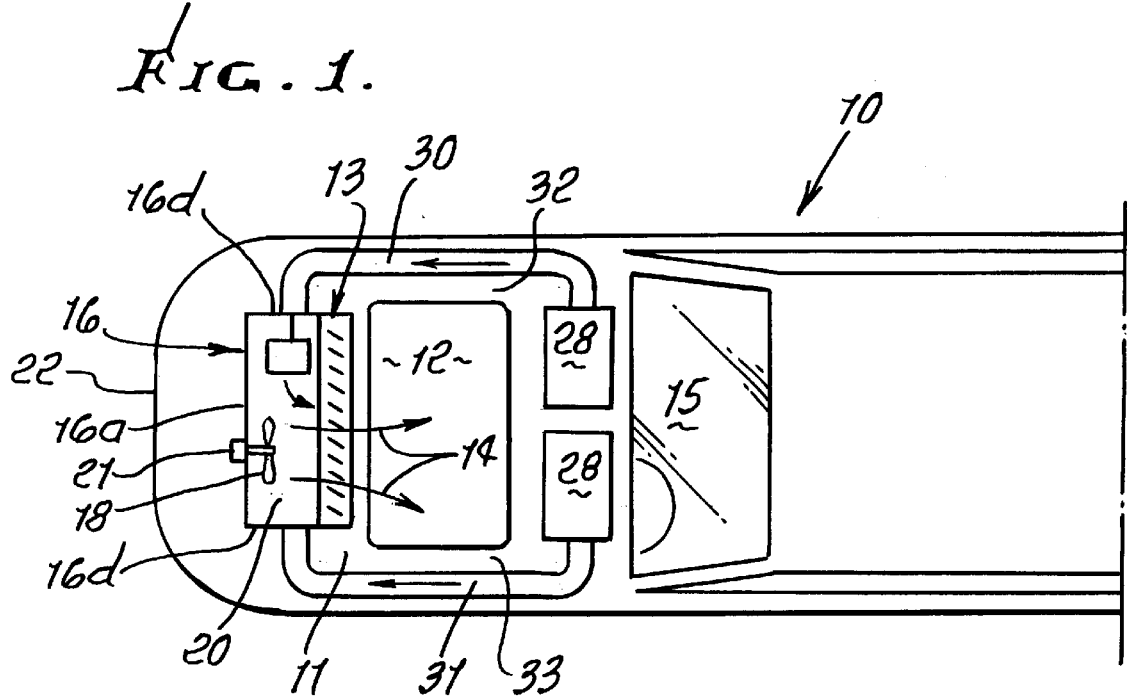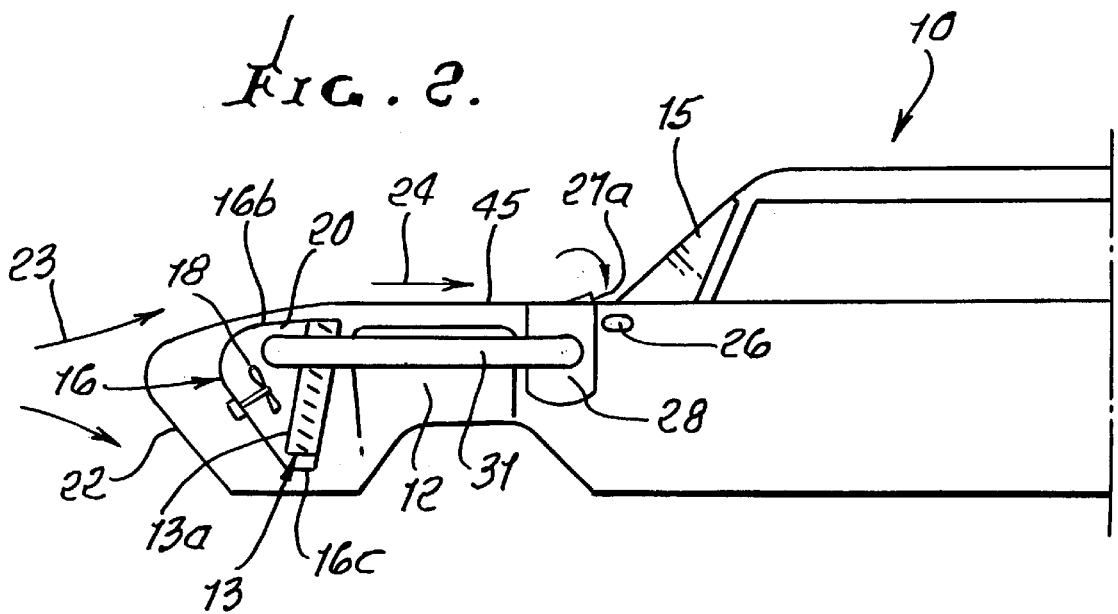

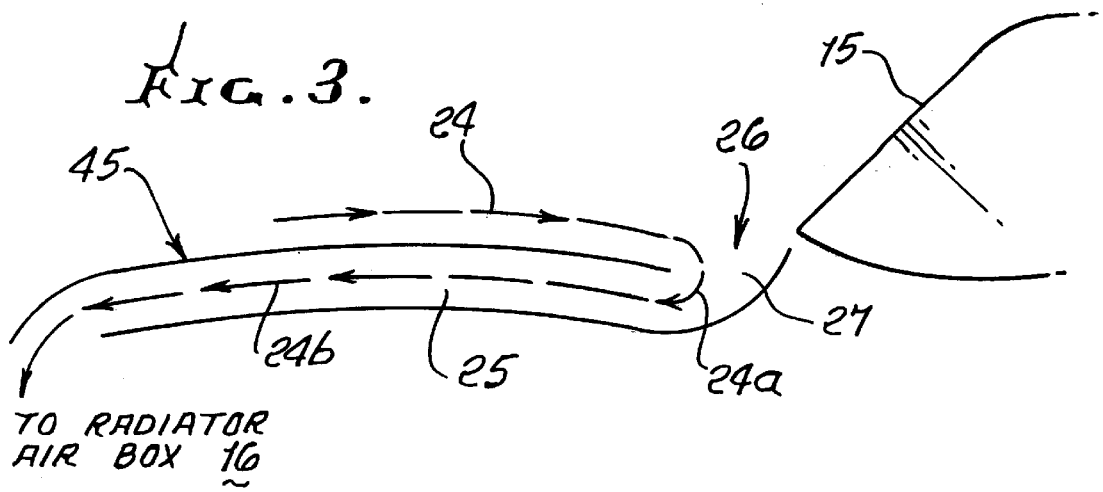
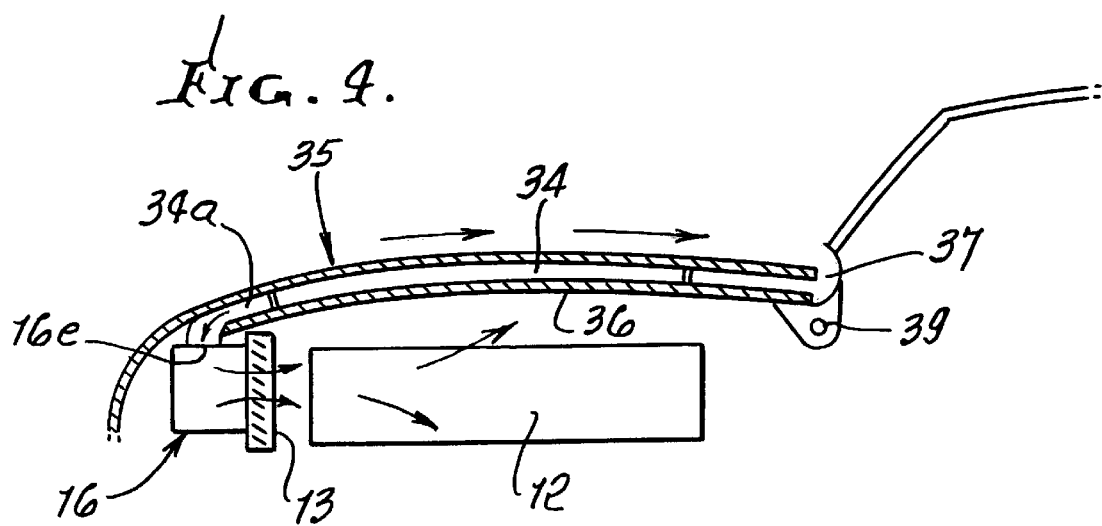
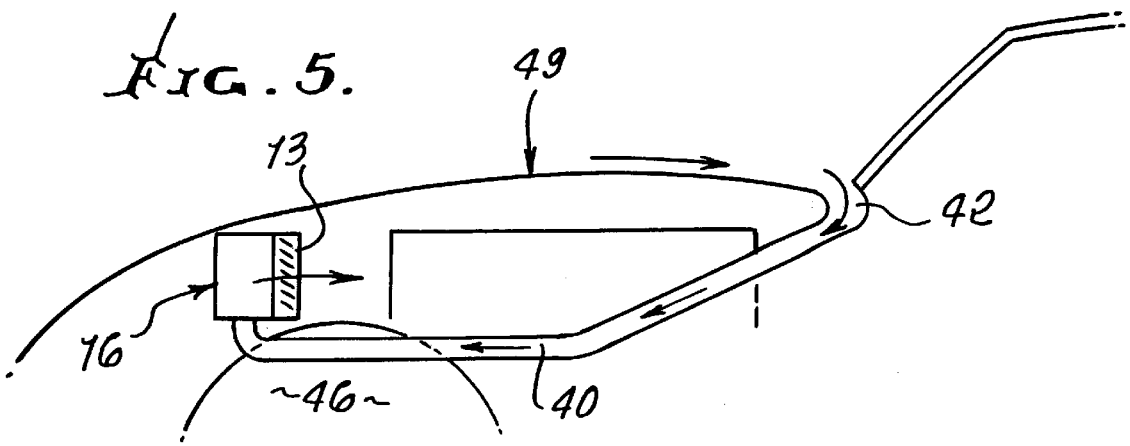

AIR COOLING OF VEHICLE RADIATORS

BACKGROUND OF THE INVENTION

This invention relates generally to air cooling of vehicle engines; and more particularly concerns unusual advantages obtained by ducting of cooling air flow from near the vehicle windshield to a plenum chamber associated with the radiator.

There is need for the unusual combinations of structures, modes of operation of such structures, and unusually beneficial results, as are disclosed herein.

SUMMARY OF THE INVENTION

It is a major object of the invention to provide highly beneficial and efficient vehicle engine air cooling, in association with a vehicle engine compartment, and a heat radiator that passes cooling air flowing toward the engine. Basically, the apparatus of the invention includes a) a cooling air receiving plenum chamber located at the air inlet side of the radiator, and b) air inlet ducting having an entrance proximate the windshield to receive air flowing over the vehicle hood, as may define the engine compartment, c) and at least one passage communicating with that air inlet ducting and the plenum chamber to deliver cooling air to the plenum chamber for efficient application to and flow through the radiator.

As will be seen, the plenum chamber is typically located forwardly of the engine, in the direction of vehicle forward travel; also, the engine compartment may then be closed, forwardly of the plenum chamber. As a result, the closed forward panel structure that faces on-coming air flow may be contoured to offer minimum resistance of the vehicle to such on-coming air flow, enhancing engine fuel savings.

The plenum chamber preferably has an effectively enlarged cross-sectional area, greater than the area of the flow passage to the plenum chamber, to receive air pressure, for efficiently distributed application over the inlet area of the radiator, for enhanced cooling efficiency.

It is another object of the invention to provide a fan in the plenum chamber to displace and re-direct cooling air flow through the radiator and over the engine, such cooling air being supplied to the plenum chamber from the inlet ducting proximate the windshield. As will be seen, the vehicle engine compartment typically has a hood lid over which external cooling air is flowable toward the entrance to the air inlet ducting, the air passage extending toward said plenum located below the level of the lid. The air flow passage typically extends forwardly, in offset relation to the engine, and out of sideward communication with the engine.

The air flow passage may extend above the engine, and adjacent the lid; and a panel may be provided below the lid and extending generally in the same direction as said lid, the flow passage formed between the lid and the panel.

It is another object to provide the air flow passage to the plenum chamber to tilt with the lid, as the lid is raised and lowered.

A further object is to provide the air flow passage extending forwardly to the plenum chamber to be located within one or more ducts located either within the engine compartment, or outside that compartment; or, the passage may extend within the vehicle wheel well.

A yet further object is to provide the vehicle with contoured forward panel structure that faces externally forwardly, at the forwardmost extent of said engine compartment, that contoured panel structure blocking access of air to the engine compartment, via the front side of said panel structure. Accordingly, there is no need for a grille, and cost savings are obtained.

These and other objects and advantages of the invention, as well as the details of an illustrative embodiment, will be more fully understood from the following specification and drawings, in which:

DRAWING DESCRIPTION

FIG. 1 is a top schematic plan view of apparatus incorporating the invention;

FIG. 2 is a side schematic view of the FIG. 1 apparatus;

FIG. 3 is a schematic view of an air flow passage leading from an air inlet or entrance over the vehicle windshield, to the plenum chamber;

FIG. 4 is a schematic side view showing an alternative air passage in association with a tiltable engine compartment lid; and FIG. 5 is a schematic side view showing alternative air passage ducting extending in association with a vehicle wheel well, outside the engine compartment.

DETAILED DESCRIPTION

In FIGS. 1 and 2, showing a preferred embodiment, or one preferred embodiment, a motor vehicle 10 has an engine compartment 11 containing an engine 12 that drives the vehicle. A heat radiator 13 is located forwardly of the engine, and extends upright. It receives liquid coolant from the engine and recirculates it to the engine. The radiator is perforated to pass cooling air in heat transfer relation to liquid coolant ducts in the radiator. Such cooling air flows rearwardly in the compartment 11. See arrows 14. A vehicle windshield is shown at 15.

A cooling air receiving plenum chamber or box is shown at 16 at the front side 13a of the radiator. It has a front wall 16a, top wall 16b, bottom wall 16c, and side walls 16d. The chamber 16 may be generally co-extensive with i.e. span the radiator front side 13a, i.e. vertically and horizontally, as shown, whereby cooling air flow received in the plenum chamber circulates in the chamber interior toward the radiator front side and passes rearwardly substantially at the same rate through all portions of the radiator, for maximum heat transfer efficiency, i.e. cooling of the liquid flowing in the radiator. Also, the effective cross-sectional flow area $A_2$ of the plenum chamber is substantially larger than the cross-sectional area or areas $A_1$ of the air flow passage or passages 25 to the plenum chamber, to recover pressure directly adjacent the radiator for effecting well distributed flow through the radiator. A fan or fans 18 may be located in the chamber interior 20, as seen in FIG. 2, and driven as at 21, or by drive from an engine driven sheave, to assist in displacing and re-directing cooling air flow through the radiator. Forward wall 16a of the plenum chamber 16 is preferably closed, and spaced rearwardly from the vehicle forward panel or panels 22 that face the exterior, frontwardly of the vehicle. Panel or panels 22 are also closed and contoured aerodynamically, i.e. forwardly convex, to deflect the on-coming air flow or streams 23, to minimize resistance to vehicle forward travel. This assists in fuel savings.

Air inlet ducting is provided to have an entrance, or entrances, proximate the windshield, to receive cooling air flowing rearwardly at 24 over the vehicle engine compartment, as for example over a hood or lid 45 at the top of that compartment. FIG. 3 schematically shows such an entrance 26 via which cooling air flow 24 enters air inlet ducting 27 at the foot of the windshield 15. The air then flows reversely at 24a and 24b, through an elongated passage extending forwardly to the plenum chamber or box 16, as referred to.

In FIG. 1, the air inlet ducting includes two laterally spaced plenums 28 extending below the hood or lid 24, near its pivot location 26. Air enters the plenum as at entrances 27a associated with rearwardmost extents of the lid or hood, and at the foot of the windshield.

Two passages, as may be defined by ducting 30 and 31, extend from the respective plenums 28 to opposite sides of the receiving plenum 16, to conduct cooling air forwardly and discharge cooling air streams into that larger plenum. Ducts 30 and 31 may typically extend at opposite sides of the engine, within the engine compartment, so as not to interfere with normal servicing of the engine. The passages defined by ducting 30 and 31 are below the level of the lid or hood, and offset from the engine, as by spacing at 32 and 33.

FIG. 4 shows an alternative configuration with a cooling air passage 34 located above the engine, and immediately below pivotable hood or lid 35. Panel 36 spaced below lid 35 cooperates with the lid to define passage 34, which extends forwardly from an entrance 37 at the foot of the windshield to the plenum chamber 16, as described above. Passage 34 tilts up and down with the lid, as about pivot 39, lower panel 36 being operatively attached to the lid. Forward terminals 34a of the passage 34 formed by the panel and lid extend close to an entrance 16e. at the top of the plenum, in lid closed position.

FIG. 5 shows a duct 40 defining a cooling air passage 41 extending from an entrance 42 to chamber 16. Duct 40 is forwardly elongated, extends below the level of the lid, and also extends externally of the engine compartment, as through a vehicle wheel well 46. The vehicle hood is shown at 49.

We claim:

1. In combination with a vehicle hood and windshield, an engine compartment, an engine in the compartment, and a heat radiator located to pass cooling air flowing toward the engine, the radiator having an air inlet side, said combination comprising a) a cooling air receiving plenum chamber located at the air inlet side of the radiator, and b) air inlet ducting having an entrance proximate the windshield to receive air flowing over the vehicle hood, c) and at least one passage communicating with said air inlet ducting and said plenum chamber to deliver cooling air to said plenum chamber for flow through the radiator.

2. The combination of claim 1 wherein said plenum chamber is located forwardly of said engine, in the direction of vehicle forward travel.

3. The combination of claim 2 wherein said compartment is substantially closed forwardly of said plenum chamber.

4. The combination of claim 2 wherein said plenum chamber has a front wall, spaced forwardly of the radiator, said front wall being closed against entry of air from a sub-compartment spaced forwardly of the plenum chamber.

5. The combination of claim 1 including a fan in said plenum chamber operable to displace cooling air through the radiator.

6. The combination of claim 4 including a fan located in said plenum chamber rearwardly of the plenum chamber front wall, the fan being operable to displace cooling air through the radiator.

7. The combination of claim 6 including means to rotate the fan.

8. The combination of claim 1 wherein said hood defines a vehicle engine compartment lid over which external cooling air is flowable toward said entrance to the air inlet ducting, said passage extending toward said plenum below the level of said lid.

9. The combination of claim 8 wherein said plenum chamber is located forwardly of said engine, in the direction of vehicle forward travel, and said passage extends forwardly and is offset from said engine, and out of direct flow communication with the engine.

10. The combination of claim 9 wherein said passage extends above the engine.

11. The combination of claim 10 wherein said passage extends adjacent the underside of said lid.

12. The combination of claim 11 including a panel spaced below said lid and extending generally in the same direction as said lid, said passage formed between the lid and said panel.

13. The combination of claim 12 wherein said passage and said lid are tiltable up and down, in unison.

14. The combination of claim 9 including ducting forming said passage, the ducting offset from the engine and the lid.

15. The combination of claim 14 wherein said ducting extends forwardly in said engine compartment.

16. The combination of claim 14 wherein said ducting extends forwardly outside said engine compartment.

17. The combination of claim 16 including a vehicle wheel well, said ducting extending in said vehicle wheel well.

18. The combination of claim 3 wherein the vehicle has contoured panel structure that faces externally forwardly, at the forwardmost extent of said engine compartment, said contoured panel structure blocking access of air to said compartment, via the front side of said panel structure.

19. The combination of claim 1 wherein said air inlet ducting includes an air inlet and at least one inlet plenum chamber located proximate said air inlet.

20. The combination of claim 1 wherein said one passage extends forwardly at one side of the engine, there being a second passage extending forwardly at the opposite side of the engine and communicating between said air inlet ducting and said plenum chamber.

21. The combination of claim 20 wherein said air inlet ducting includes one air inlet plenum communicating with said one passage, and a second air inlet plenum communicating with said second passage, and said air inlet plenums are both spaced closer to said windshield than said cooling air receiving plenum chamber.

22. The combination of claim 1 wherein the plenum chamber has an effective cross sectional flow area $A_1$, and the passage or passages flowing air to the plenum chamber has or have an effective cross-sectional flow area $A_2$, where $A_1$ is substantially greater than $A_2$ for effecting recovery of air pressure in the plenum chamber applied directly to the radiator, and where the plenum chamber effectively spaces the flow receiving inlet side of the radiator.

23. For combination with a vehicle hood and windshield, an engine compartment, an engine in the compartment, and a heat radiator located to pass cooling air flowing toward the engine, the radiator having an air inlet side, the combination comprising a) a cooling air receiving plenum chamber located at the air inlet side of the radiator, and b) air inlet ducting having an entrance proximate the windshield to receive air flowing over said vehicle engine hood, c) and at least one passage communicating with said air inlet ducting and said plenum chamber to deliver cooling air to said plenum chamber for flow through the radiator, d) and wherein the plenum chamber has an effective flow cross sectional area $A_1$, and the passage or passages flowing air to the plenum chamber has or have an effective cross-sectional flow area $A_2$, where $A_1$ is substantially greater than $A_2$ for effecting recovery of air pressure in the plenum chamber to be applied directly to the radiator, and where the plenum chamber effectively spans the flow receiving side of the radiator.

* * * * *